(12) United States Patent
Sim

(10) Patent No.: US 12,353,751 B2
(45) Date of Patent: Jul. 8, 2025

(54) STORAGE DEVICE AND METHOD OF OPERATING THE SAME

(71) Applicant: SK hynix Inc., Icheon-si (KR)

(72) Inventor: Joon Seop Sim, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 1045 days.

(21) Appl. No.: 17/361,968

(22) Filed: Jun. 29, 2021

(65) Prior Publication Data

US 2022/0197540 A1 Jun. 23, 2022

(30) Foreign Application Priority Data

Dec. 22, 2020 (KR) .................. 10-2020-0181089

(51) Int. Cl.
*G06F 3/06* (2006.01)
*G06F 17/16* (2006.01)

(52) U.S. Cl.
CPC .......... *G06F 3/0655* (2013.01); *G06F 3/0604* (2013.01); *G06F 17/16* (2013.01); *G06F 2212/454* (2013.01)

(58) Field of Classification Search
CPC .. G06F 17/153; G06F 17/16; G06F 2212/454; G06N 3/063; G06N 3/04; G06N 3/0464–0475; G06N 3/0495
See application file for complete search history.

(56) References Cited

U.S. PATENT DOCUMENTS

| 2016/0342895 | A1* | 11/2016 | Gao ........................ G06N 3/044 |
| 2019/0205746 | A1* | 7/2019 | Nurvitadhi .............. G06F 7/483 |
| 2021/0279569 | A1* | 9/2021 | Kim ........................ G06N 3/08 |
| 2022/0374348 | A1* | 11/2022 | Hazel .................. G06F 12/0607 |

FOREIGN PATENT DOCUMENTS

| KR | 20150019359 A | 2/2015 |
| KR | 20170097626 A | 8/2017 |
| KR | 20190115402 A | 10/2019 |
| KR | 20200018188 A | 2/2020 |
| KR | 20200030082 A | 3/2020 |

(Continued)

OTHER PUBLICATIONS

S. Cho et al., McDRAM v2: IN-Dynamic Random Access Memory Systolic Array Accelerator to Address the Large Model Problem in Deep Neural Networks on the Edge, IEEEAccess.2020.3011265, Aug. 3, 2020 (Year: 2020).*

(Continued)

*Primary Examiner* — Emily E Larocque
(74) *Attorney, Agent, or Firm* — Perkins Coie LLP

(57) ABSTRACT

Methods, systems, and devices for alleviating a bandwidth bottleneck during an embedding operation are described. An example storage device, based on the disclosed technology, includes a memory device configured to store matrix data, a memory controller, coupled to the memory device, configured to receive, from a host, non-zero data and the index of the non-zero data, and generate vector data based on the non-zero data and the index, and an operating component, coupled to the memory device and the memory controller, configured to perform a multiplication operation between the matrix data and the vector data.

12 Claims, 6 Drawing Sheets

(56) References Cited

FOREIGN PATENT DOCUMENTS

| KR | 20200067603 A | 6/2020 | |
| WO | WO-2022057406 A1 * | 3/2022 | ........... G06F 16/316 |

OTHER PUBLICATIONS

D.A. Patterson et al., Computer Organization and Design, the Hardware/Software Interface, fifth edition, Elsevier 2014 (Year: 2014).*

Kwon, Y. et al., "TensorDIMM: A Practical Near-Memory Processing Architecture for Embeddings and Tensor Operations in Deep Learning." MICRO-52, Oct. 12-16, 2019, 14 pages.

* cited by examiner

STORAGE DEVICE AND METHOD OF OPERATING THE SAME

CROSS-REFERENCE TO RELATED APPLICATION

This patent document claims priority to and benefits of the Korean patent application number 10-2020-0181089, filed Dec. 22, 2020, which is incorporated herein by reference in its entirety.

TECHNICAL FIELD

Various embodiments of the present disclosure generally relate to an electronic device, and more particularly, to a storage device and a method of operating the same.

BACKGROUND

A storage device is a device configured to store data under the control of a host device, such as a computer, a smartphone, or the like. The storage device may include a memory device configured to store data and a memory controller configured to control the memory device. The memory device may be classified as a volatile memory device or a non-volatile memory device.

The volatile memory device may be a memory device configured to store data only during the supply of power and to cause the stored data to be erased when a power supply is interrupted. Examples of a volatile memory device include a Static Random Access Memory (SRAM), a Dynamic Random Access Memory (DRAM), and the like.

The non-volatile memory device is a memory device configured such that data is not erased even though a power supply is interrupted. Examples of a non-volatile memory device include a Read Only Memory (ROM), a Programmable ROM (PROM), an Electrically Programmable ROM (EPROM), an Electrically Erasable and Programmable ROM (EEPROM), a flash memory, and the like.

SUMMARY

Embodiments of the disclosed technology are directed to a storage device capable of, amongst other features and benefits, reducing a bandwidth bottleneck at the time of an embedding operation and a method of operating the storage device.

An example embodiment of the present disclosure provides for a storage device. The storage device includes a memory device configured to store matrix data, a memory controller, coupled to the memory device, configured to receive, from a host, non-zero data and an index of the non-zero data, and generate vector data based on the non-zero data and the index, and an operating component, coupled to the memory device and the memory controller, configured to perform a multiplication operation between the matrix data and the vector data.

Another example embodiment of the present disclosure provides for a method of operating a storage device. The method includes storing matrix data, receiving, from a host, non-zero data and an index of the non-zero data, generating vector data based on the non-zero data and the index, and performing a multiplication operation between the matrix data and the vector data.

Yet another embodiment of the present disclosure provides for a storage device. The storage device includes a memory device configured to store an embedding table including a plurality of embedding vectors, a memory controller, coupled to the memory device, configured to receive, from a host, non-zero data included in a first one-hot vector corresponding to target data and an index of the non-zero data, and generate a second one-hot vector based on the non-zero data and the index, and an operating component, coupled to the memory device and the memory controller, configured to calculate an embedding vector for the target data based on the embedding table and the second one-hot vector.

Yet another example embodiment of the present disclosure provides for a storage device. The storage device includes a memory device configured to store matrix data, a memory controller configured to receive non-zero data and an index of the non-zero data from a host and to generate vector data based on the non-zero data and the index, and an operating component configured to perform a multiplication operation between the matrix data and the vector data.

Yet another example embodiment of the present disclosure provides for a method of operating a storage device. The method includes storing matrix data, receiving non-zero data and an index of the non-zero data from a host, generating vector data based on the non-zero data and the index, and performing a multiplication operation between the matrix data and the vector data.

Yet another example embodiment of the present disclosure provides for a storage device. The storage device includes a memory device configured to store an embedding table including a plurality of embedding vectors, a memory controller configured to receive non-zero data included in a one-hot vector corresponding to target data and an index of the non-zero data from a host and to generate the one-hot vector based on the non-zero data and the index, and an operating component configured to calculate an embedding vector for the target data based on the embedding table and the generated one-hot vector.

DETAILED DESCRIPTION

Figure 1:
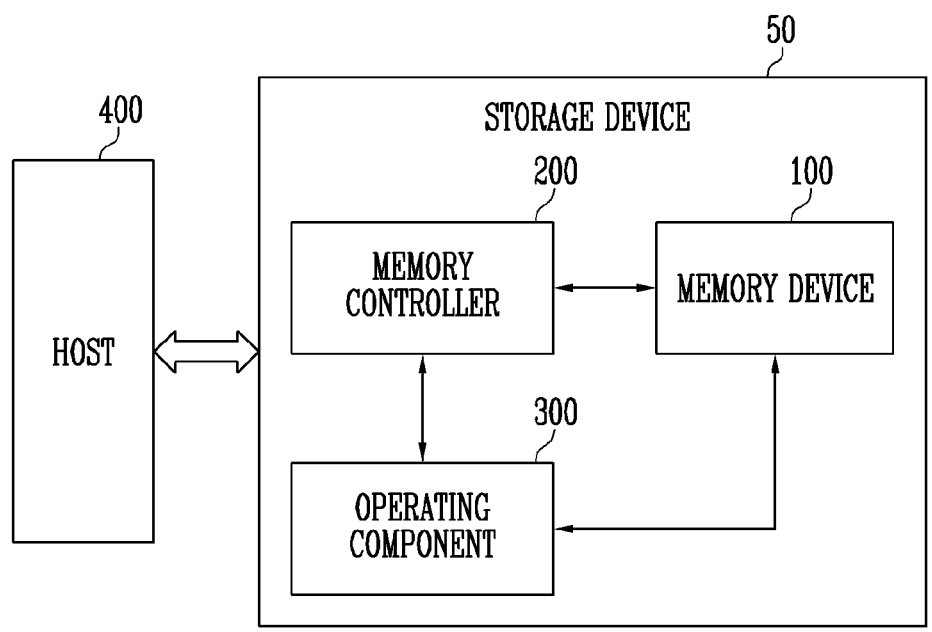
FIG. 1 is a diagram illustrating an example computing system in accordance with an embodiment of the presently disclosed technology.

FIG. 1 is a diagram illustrating an example computing system in accordance with an embodiment of the presently disclosed technology. As shown therein, the computing system 10 includes a storage device 50 and a host 400.

In some embodiments, the storage device 50 includes a memory device 100, a memory controller 200 configured to control the operation of the memory device 100, and an operating component 300. The storage device 50 may be a device configured to store data under the control of the host 400, such as a mobile phone, a smartphone, an MP3 player, a laptop computer, a desktop computer, a game console, a TV, a tablet PC, an in-vehicle infotainment system, or the like.

In some embodiments, the storage device 50 is manufactured as any one of various types of storage devices depending on a host interface, which is a method of communicating with the host 400. For example, the storage device 50 can be configured as any one of various types of storage devices, such as a solid state drive (SSD), a multimedia card in the form of a MultiMedia Card (MMC), an eMMC, a reduced-size MMC (RS-MMC), or a micro-MMC, a secure digital (SD) card, a mini-SD, or a micro-SD, a universal storage bus (USB) storage device, a universal flash storage (UFS) device, a storage device in the form of a personal computer memory card international association (PCMCIA) card, a storage device in the form of a peripheral component interconnection (PCI) card, a storage device in the form of a PCI express (PCI-E) card, a compact flash (CF) card, a smart media card, a memory stick, and the like.

In some embodiments, the storage device 50 is manufactured as any one of various types of package forms. For example, the storage device 50 can be manufactured as a package on package (POP), a system in package (SIP), a system on chip (SOC), a multi-chip package (MCP), a chip on board (COB), a wafer-level fabricated package (WFP), a wafer-level stack package (WSP), and the like.

Continuing with the description of FIG. 1, the storage device 50 includes the memory device 100 and the memory controller 200, which is configured to control the operation of the memory device 100. In an example, the storage device 50 is a device configured to store data under the control of the host 400, such as in a mobile phone, a smartphone, an MP3 player, a laptop computer, a desktop computer, a game console, a TV, a tablet PC, an in-vehicle infotainment system, or the like.

In some embodiments, the memory device 100 stores data, and is operated and controlled by the memory controller 200.

In some embodiments, the memory device 100 may include a memory cell array (not illustrated in FIG. 1) including a plurality of memory cells configured to store data. Each of the memory cells may be configured as a Single Level Cell (SLC) configured to store a single data bit, a Multi-Level Cell (MLC) configured to store two data bits, a Triple Level Cell (TLC) configured to store three data bits, or a Quad Level Cell (QLC) capable of storing four data bits.

In some embodiments, the memory cell array includes a plurality of memory blocks. In an example, each of the memory blocks includes a plurality of memory cells. In another example, a single memory block includes a plurality of pages. In these embodiments, a page may be a unit by which data is stored in the memory device 100 or by which data stored in the memory device 100 is read. The memory block may be a unit by which data is erased.

In some embodiments, the memory device 100 is a volatile memory device. For example, the memory device 100 may be a Dynamic Random Access Memory (DRAM), an SDRAM, a DDR SDRAM, a DDR2 SDRAM, a DDR3 SDRAM, an LPDDR SDRAM, an LPDDR2 SDRAM, an LPDDR3 SDRAM, or the like.

In some embodiments, the memory device 100 is a non-volatile memory device. For example, the memory device 100 may be a Double Data Rate Synchronous Dynamic Random Access Memory (DDR SDRAM), a Low Power Double Data Rate4 (LPDDR4) SDRAM, a Graphics Double Data Rate (GDDR) SDRAM, a Low Power DDR (LPDDR), a Rambus Dynamic Random Access Memory (RDRAM), a NAND flash memory, a vertical NAND, a NOR flash memory, a resistive random access memory (RRAM), a phase-change random access memory (PRAM), a magnetoresistive random access memory (MRAM), a ferroelectric random access memory (FRAM), a spin transfer torque random access memory (STT-RAM), or the like.

In some embodiments, the memory device 100 is configured to receive a command CMD and an address ADDR from the memory controller 200 and to access an area selected by the address in the memory cell array. The memory device 100 may perform an operation dictated by the command CMD for the area selected by the address ADDR. For example, the memory device 100 can perform a write operation (program operation), a read operation, and an erase operation. At the time of a program operation, the memory device 100 programs data in the area selected by the address ADDR. At the time of a read operation, the memory device 100 reads data from the area selected by the address ADDR. At the time of an erase operation, the memory device 100 erases data stored in the area selected by the address ADDR.

In some embodiments, the memory controller 200 may control the overall operation of the storage device 50. In other embodiments, when power is applied to the storage device 50, the memory controller 200 may execute firmware FW.

In some embodiments, the memory controller 200 receives data and a logical block address (LBA) from the host 400, and converts the logical block address to a physical block address (PBA) indicating the address of the memory cells included in the memory device 100 in which the data is to be stored. In this patent document, a logical block address (LBA) and a "logical address" may be interchangeably used as having the same meaning, and a physical block address (PBA) and a "physical address" may be interchangeably used as having the same meaning.

In some embodiments, the memory controller 200 controls the memory device 100 to perform a program operation, a read operation, an erase operation, or the like in response to a request from the host 400. At the time of a program operation, the memory controller 200 provides a write command, a physical block address, and data to the memory device 100. At the time of a read operation, the memory controller 200 provides a read command and a physical block address to the memory device 100. At the time of an erase operation, the memory controller 200 provides an erase command and a physical block address to the memory device 100.

In some embodiments, the memory controller 200 controls two or more memory devices 100. In this case, the memory controller 200 controls the two or more memory devices 100 according to an interleaving method in order to improve operation performance. The interleaving method may be a method by which the operations for the two or more memory devices 100 are controlled to overlap.

Continuing with the description of FIG. 1, the operating component 300 may perform arithmetic operations, such as addition, multiplication, and the like. For example, the operating component 300 may be implemented with hardware components such as one or more processors, memory, and the like. For example, the operating component 300 may include a computing unit for performing arithmetic operations.

As illustrated in FIG. 1, the memory controller 200 and the operating component 300 are individual devices separated from each other, but are not limited thereto. For example, the operating component 300 may be implemented as a component of the memory controller 200.

In some embodiments, the host 400 communicates with the storage device 50 using at least one of various communication methods, such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), NonVolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), Load Reduced DIMM (LRDIMM), and the like.

In some embodiments, the computing system 10 is configured to provide a recommendation system. For example, the recommendation system may recommend items in which a user would be interested (e.g., movies, music, news, books, products, and the like) based on information about the user. In some embodiments, the computing system 10 provides the recommendation system using a recommendation model based on deep learning. Herein, the recommendation model may be a learning model trained using a plurality of training data sets. For example, the recommendation model based on deep learning includes a plurality of neural networks, and the plurality of neural networks are trained using the plurality of training data sets. Each of the neural networks includes a plurality of layers. For example, the neural network may include an input layer, one or more hidden layers, and an output layer. A neural network that includes a plurality of hidden layers is called a 'deep neural network', and training the deep neural network is called 'deep learning'. Hereinafter, training a neural network may be understood as training the parameters of the neural network, and the trained neural network may be understood as a neural network to which the trained parameters are applied.

In some embodiments, the recommendation system of the computing system 10 is under the control of the host 400. For example, the host 400 includes a host processor and a host memory. The host processor may be a general-purpose processor, such as a central processing unit (CPU), an accelerated processing unit (APU), a digital signal processor (DSP), or the like, a graphics processor, such as a graphics processing unit (GPU) or a vision processing unit (VPU), an artificial intelligence (AI) processor such as a neural processing unit (NPU), or the like. The host memory may store an operating system or an application program for providing the recommendation system.

In some embodiments, the recommendation system based on deep learning may cause a bandwidth problem because it performs memory-intensive embedding operations, and may cause a problem of the lack of the capacity of the host memory because a large amount of service data is required therefor. Accordingly, the computing system 10 may perform embedding using the storage device 50 for efficient embedding.

In some embodiments, the host 400 controls the storage device 50 to acquire an embedding vector for target data. For example, the host 400 requests the embedding vector from the storage device 50, thereby being provided with the corresponding embedding vector from the storage device 50. Using the provided embedding vector, the host 400 performs various operations for outputting a recommendation result based on a preset algorithm.

In some embodiments, the memory device 100 stores an embedding table including a plurality of embedding vectors.

In some embodiments, the memory controller 200 receives non-zero data and an index of the non-zero data from the host 400. Here, the non-zero data is data having a value that is not zero among the values of vector elements in a one-hot vector corresponding to the target data. Indices indicate the positions of vector elements in a one-hot vector. For example, the index i indicates the i-th vector element. The index of the non-zero data may be the index of the vector element having the non-zero data. The memory controller 200 then generates vector data based on the non-zero data and the index. For example, the generated vector data is a one-hot vector for the target data.

In some embodiments, the operating component 300 calculates the embedding vector for the target data based on the embedding table and the vector data generated by the memory controller 200. For example, the operating component 300 calculates the embedding vector through a multiplication operation between the embedding table and the vector data. Then, the memory controller 200 provides the calculated embedding vector to the host 400.

Figures 2, 3:
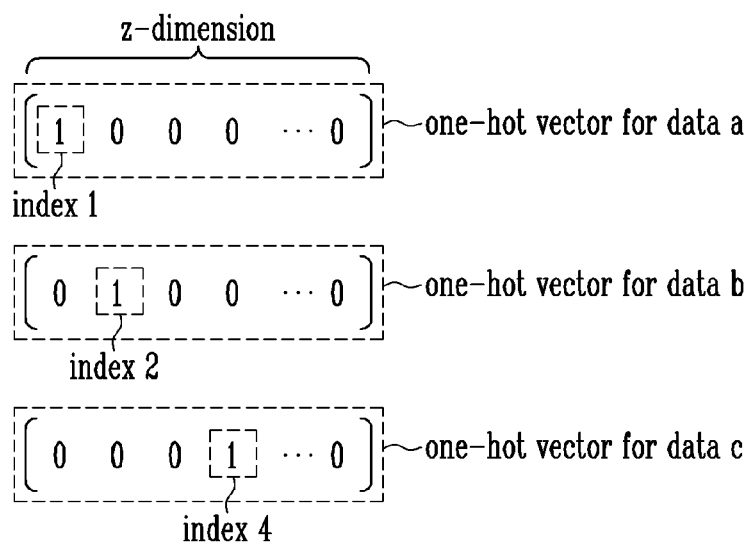
FIG. 2 is a diagram illustrating an example embedding operation in accordance with an embodiment of the presently disclosed technology.
FIG. 3 is a diagram illustrating an example one-hot vector in accordance with an embodiment of the presently disclosed technology.

FIG. 2 is a diagram illustrating an example embedding operation in accordance with an embodiment of the presently disclosed technology.

As illustrated in FIG. 2, an embedding operation may be performed as an operation between a one-hot vector and an embedding table. Here, the one-hot vector is a vector with one of a plurality of vector elements having a non-zero value and the remaining vector elements being zero-valued. The description of a one-hot vector will further clarified with reference to FIG. 3.

In some embodiments, the embedding table includes vector information that is acquired through embedding learning using multiple training data sets. In some embodiments, the embedding table includes a plurality of embedding vectors that represent a plurality of pieces of data in the form of n-dimensional vectors. For example, the rows of the embedding table may be embedding vectors for the plurality of pieces of data. Therefore, the number of rows of the embedding table may be determined based on the number of pieces of data. Furthermore, the number of columns of the embedding table may be set based on the dimensionality intended to be represented using the embedding vector. In this example, the dimensionality of the embedding vector may be lower than the dimensionality of the one-hot vector.

In some embodiments, the plurality of pieces of data is categorical data that can be classified into categories. For example, the plurality of pieces of data may be items recommended by the computing system 10, and can be digitized in the form of vectors having similarity therebetween through an embedding operation. Vector information digitized in the form of a vector may be called an embedding vector.

For example, an embedding vector for specific data is calculated through the operation between a one-hot vector for the specific data and an embedding vector. Herein, the one-hot vector for the specific data is configured such that only the vector element corresponding to the index assigned to the specific data has a non-zero value and the remaining vector elements are zero-valued. Accordingly, through the operation between the one-hot vector for the specific data and the embedding vector, the embedding vector for the specific data may be determined from among the plurality of embedding vectors included in the embedding table.

Although the embedding operation is described as an operation between a one-hot vector placed first and an embedding table placed second, as in the above-described example, it is not limited thereto. For example, the embedding operation may be performed through an operation between an embedding table placed first and a one-hot vector placed second. In this latter case, the one-hot vector may take the form of a column vector, rather than a row vector, and the columns of the embedding table may be embedding vectors for a plurality of pieces of data. In this case, the number of columns of the embedding table may be based on the number of pieces of data, and the number of rows of the embedding table may be based on the dimensionality intended to be represented using the embedding vector.

FIG. 3 is a diagram illustrating an example one-hot vector in accordance with an embodiment of the presently disclosed technology.

A shown in FIG. 3, it is assumed that index 1 is assigned to data a, index 2 is assigned to data b, and index 4 is assigned to data c. It is also assumed that the indices of vector elements included in a one-hot vector increase sequentially.

In some embodiments, the dimensionality of the one-hot vector may be based on the number of pieces of data to be represented using the one-hot vector. For example, when z pieces of data are present, a one-hot vector for each of the pieces of data may be a z-dimensional vector.

In some embodiments, the position of a non-zero value in a one-hot vector may be based on the index assigned to the data. For example, in the case of a one-hot vector for data a, the value of the vector element corresponding to index 1 may be a non-zero value. Similarly, in the case of a one-hot vector for data b, the value of the vector element corresponding to index 2 may be a non-zero value, and in the case of a one-hot vector for data c, the value of the vector element corresponding to index 4 may be a non-zero value. In other words, the index of the non-zero value included in a one-hot vector may be the index assigned to data represented using the corresponding one-hot vector.

In the example of the above-described recommendation system, the host 400 provides the one-hot vector to the storage device 50 in order to perform an embedding operation. However, as the number of pieces of data to be represented using embedding vectors is increased, the size of a one-hot vector is increased, which causes a bandwidth bottleneck problem.

Embodiments of the presently disclosed technology described determining an embedding vector based on index identification information for target data provided from the host 400, thereby solving the bandwidth bottleneck problem.

Figure 4:
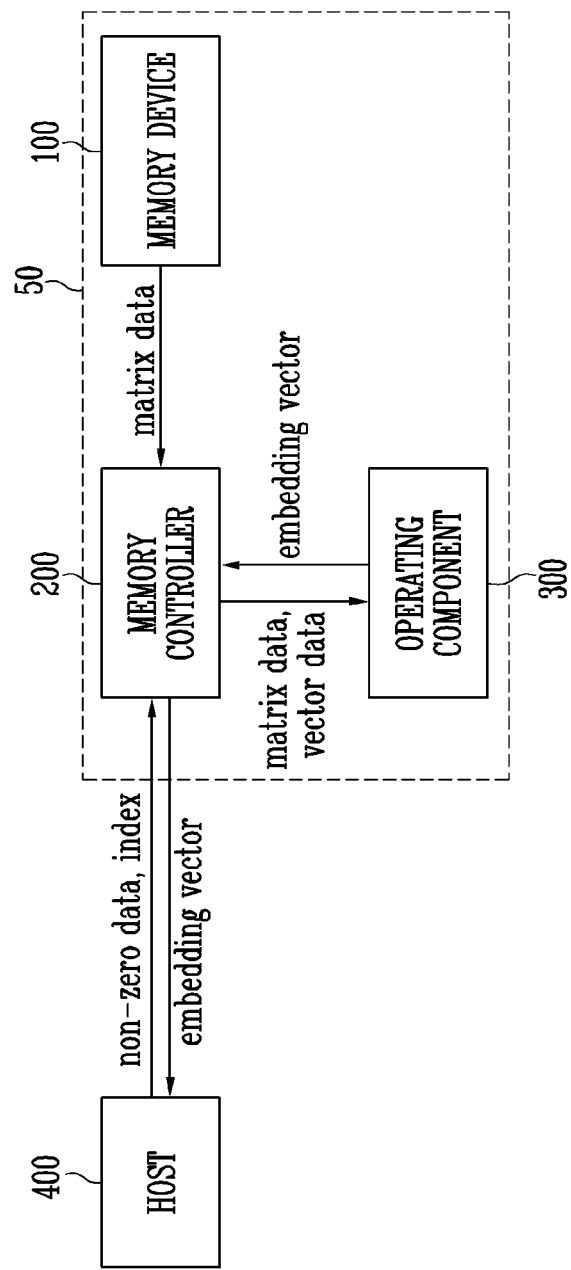
FIG. 4 is a diagram illustrating an example storage device in accordance with an embodiment of the presently disclosed technology.

FIG. 4 is a diagram illustrating an example storage device in accordance with an embodiment of the presently disclosed technology.

As illustrated in FIG. 4, the storage device 50 includes a memory device 100, a memory controller 200, and an operating component 300. In an example, the memory device 100, the memory controller 200, and the operating component 300 may be the memory device 100, the memory controller 200, and the operating component 300 illustrated in FIG. 1.

In some embodiments, the memory device 100 stores matrix data, which may be data in the form of a matrix. For example, the matrix data may be an embedding table that includes a plurality of embedding vectors that represent a plurality of pieces of data in the form of n-dimensional vectors.

In some embodiments, the memory device 100 stores the matrix data in a plurality of memory areas. For example, the memory area may be a memory cell, a page, a memory block, a plane, a die, or the like. The memory controller 200 may transmit and receive data (e.g., the matrix data) to and from the host 400.

In some embodiments, the memory controller 200 receives non-zero data and the index of the non-zero data from the host 400. Here, the non-zero data indicates a value that is not zero among the other zero-valued vector elements included in a one-hot vector corresponding to target data. The index of the non-zero data indicates the index of the vector element having a non-zero value in the one-hot vector. For example, when the memory controller 200 requests an embedding vector for the target data, the host 400 provides the non-zero data and the index of the non-zero data to the memory controller 200.

In some embodiments, the memory controller 200 generates vector data based on the non-zero data and the index of the non-zero data. Here, the vector data may be a one-hot vector, in which a vector element corresponding to the index has a non-zero value and the remaining vector elements are zero-valued. For example, the memory controller 200 may generate vector data such that, among a plurality of vector elements of the vector data, the value of the vector element corresponding to the index includes the non-zero data and the values of the remaining vector elements, excluding the vector element corresponding to the index, include zero-valued data.

In some embodiments, the operating component 300 performs a multiplication operation between the matrix data and the vector data. For example, the memory controller 200 may read the matrix data from the memory device 100 and provide the matrix data and the vector data to the operating component 300.

In some embodiments, the operating component 300 performs the embedding operation using the matrix data and the vector data. Specifically, the operating component 300 performs the embedding operation using the embedding table read from the memory device 100 and the one-hot vector generated by the memory controller 200.

In some embodiments, the operating component 300 calculates any one embedding vector, among a plurality of embedding vectors, through the multiplication operation between the matrix data and the vector data. The calculated embedding vector is the embedding vector corresponding to the target data.

In some embodiments, the memory controller 200 provides the embedding vector for the target data to the host 400 in response to the request from the host 400.

This advantageously enables embodiments of the presently disclosed technology to provide the embedding vector to the host 400 based on the non-zero data and the index provided from the host 400, thereby mitigating the bandwidth bottleneck problem.

Figure 5:
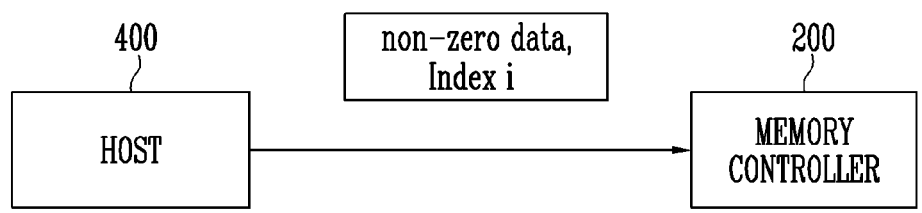
FIG. 5 is a diagram illustrating an example of the transmission of non-zero data and an index in accordance with an embodiment of the presently disclosed technology.

FIG. 5 is a diagram illustrating an example of a transmission of non-zero data and an index in accordance with an embodiment of the presently disclosed technology.

As illustrated therein, it is assumed that a one-hot vector corresponding to target data is configured such that the i-th vector element includes non-zero data.

In some embodiments, the non-zero data indicates a value that is not zero, among the values of the vector elements included in the one-hot vector corresponding to the target data. For example, the non-zero data may be '1'. The index of the non-zero data (index i) indicates the index of the vector element having the non-zero data in the one-hot vector.

In some embodiments, the host 400 provides the non-zero data and the index i, which is the index of the non-zero data, to the memory controller 200 in response to a request for an embedding vector for the target data.

Although the non-zero data is described as '1' in the example above, it is not limited thereto, and in other embodiments, the non-zero data may include any non-zero value.

Figure 6:
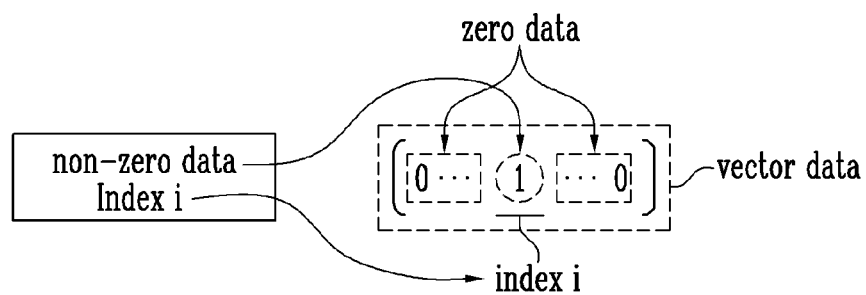
FIG. 6 is a diagram illustrating an example of the generation of vector data in accordance with an embodiment of the presently disclosed technology.

FIG. 6 is a diagram illustrating an example of generating vector data in accordance with an embodiment of the presently disclosed technology.

As illustrated therein, the memory controller 200 generates vector data based on non-zero data and the index of the non-zero data (the index i). Here, the vector data may be a one-hot vector.

For example, the vector data may include a plurality of vector elements. In some embodiments, the value of the vector element corresponding to the index, among the plurality of vector elements of the vector data, may include the non-zero data. For example, the memory controller 200 may set the value of the i-th vector element corresponding to the index i to '1', which is the non-zero data. The values of the remaining vector elements of the vector data include zero-valued data. For example, the memory controller 200 may set the values of the remaining vector elements, excluding the i-th vector element, to '0', which is zero-valued data. Accordingly, using the non-zero data and the index i, the memory controller 200 may generate a one-hot vector in which the value of the i-the vector element is '1' and the values of the remaining vector elements are '0' as the vector data.

Accordingly, embodiments of the presently disclosed technology generate a one-hot vector using non-zero data and the index thereof, and transfer the one-hot vector to solve the bandwidth bottleneck problem.

Figure 7:
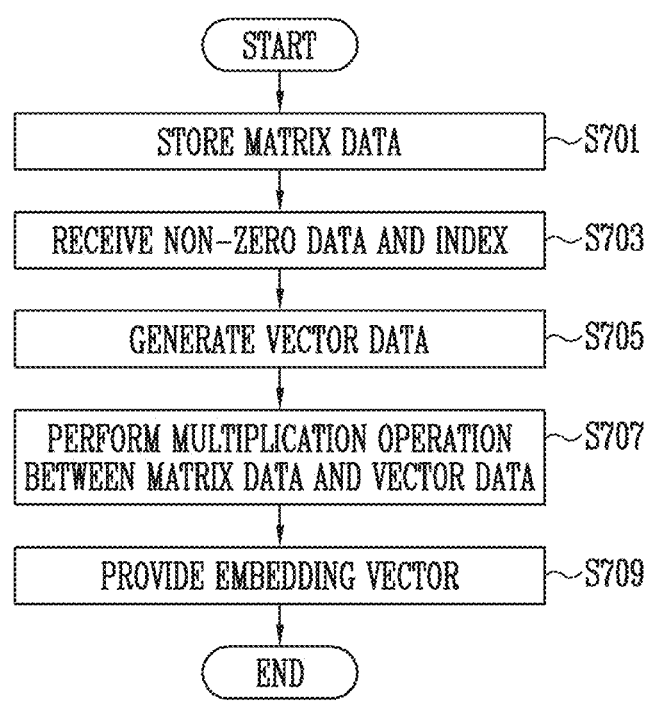
FIG. 7 is a flowchart illustrating an example method of operating a storage device in accordance with an embodiment of the presently disclosed technology.

FIG. 7 is a flowchart illustrating an example method of operating a storage device in accordance with an embodiment of the presently disclosed technology.

The method illustrated in FIG. 7 may be performed by, for example, the storage device 50 illustrated in FIG. 1 or FIG. 4.

As illustrated in FIG. 7, at step S701, the storage device 50 may store matrix data. In an example, the matrix data may be an embedding table including a plurality of embedding vectors.

At step S703, the storage device 50 receives non-zero data and the index of the non-zero data from a host 400.

At step S705, the storage device 50 generates vector data based on the non-zero data and the index thereof.

In an example, the vector data may be a one-hot vector.

In another example, the storage device 50 generates vector data such that, among the plurality of vector elements of the vector data, the value of the vector element corresponding to the index includes the non-zero data and the values of the remaining vector elements, excluding the vector element corresponding to the index, include zero-valued data.

At step S707, the storage device 50 performs a multiplication operation between the matrix data and the vector data.

In an example, the storage device 50 performs an embedding operation using the matrix data and the vector data.

In another example, the storage device 50 calculates any one of the plurality of embedding vectors included in the embedding table through a multiplication operation between the matrix data and the vector data.

At step S709, the storage device 50 provides the any one embedding vector to the host 400.

Figure 8:
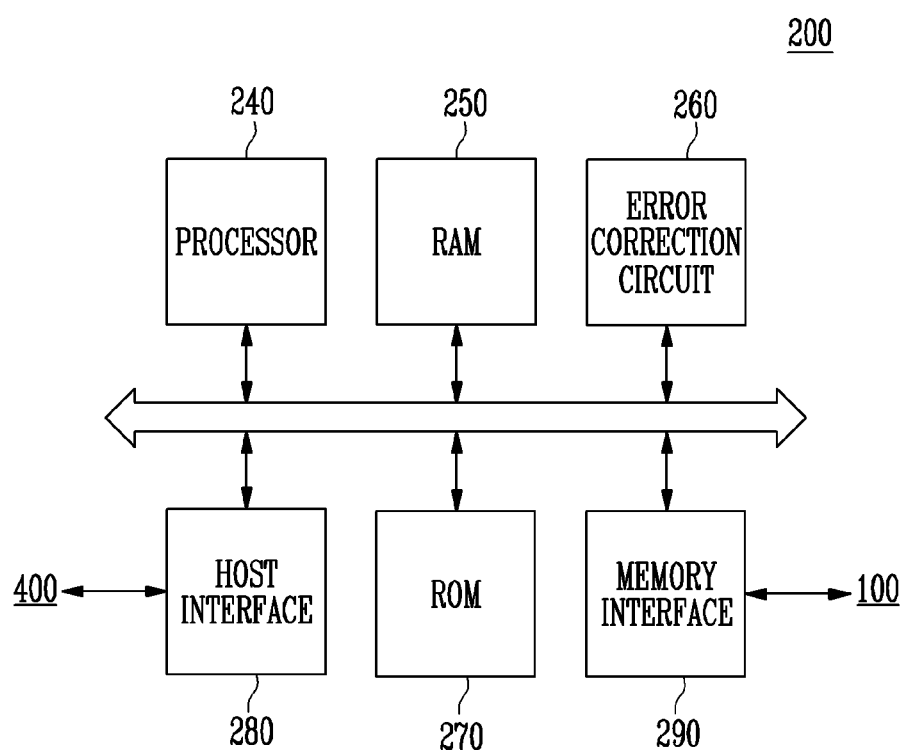
FIG. 8 is a diagram illustrating example components of the memory controller illustrated in FIG. 1, in accordance with an embodiment of the presently disclosed technology.

FIG. 8 is a diagram illustrating example components of the memory controller illustrated in FIG. 1.

Referring to FIG. 1 and FIG. 8, the memory controller 200 includes a processor 240, a RAM 250, an error correction circuit 260, a ROM 270, a host interface 280, and a memory interface 290.

The processor 240 controls the overall operation of the memory controller 200. The RAM 250 may be used as the buffer memory, the cache memory, the operating memory, or the like of the memory controller 200.

The error correction circuit 260 performs error correction. The error correction circuit 260 performs ECC encoding based on the data to be written to a memory device through the memory interface 290. The ECC-encoded data may be delivered to the memory device through the memory interface 290. The error correction circuit 260 then performs ECC decoding on the data received from the memory device through the memory interface 290. For example, the error correction circuit 260 may be included in the memory interface 290 as a component of the memory interface 290.

The ROM 270 stores various kinds of information required for the operation of the memory controller 200 in the form of firmware.

In an example, the memory controller 200 communicates with external devices (e.g., a host 400, an application processor, and the like) through the host interface 280.

In another example, the memory controller 200 communicates with the memory device 100 through the memory interface 290. The memory controller 200 may transmit a command, an address, a control signal, and the like to the memory device 100 and receive data therefrom through the memory interface 290.

The presently disclosed technology describes a storage device capable of reducing the bandwidth bottleneck at the time of an embedding operation and a method of operating the storage device.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A storage device, comprising:
a non-volatile memory device configured to store matrix data including a plurality of embedding vectors; and
at least one processor, coupled to the non-volatile memory device, configured to:
receive, from a host, a request for an embedding vector from the plurality of embedding vectors, non-zero data included in a target vector related to the embedding vector, and an index of the non-zero data, wherein the index identifies a vector element having the non-zero data from a plurality of vector elements included in the target vector,
generate the target vector such that the vector element identified by the index includes the non-zero data and remaining vector elements of the plurality of vector elements include zero data, and
generate the embedding vector based on the matrix data and the target vector.

2. The storage device according to claim 1, wherein the target vector comprises a one-hot vector.

3. The storage device according to claim 2, wherein the plurality of embedding vectors comprises information corresponding to a plurality of pieces of data formatted as n-dimensional vectors.

4. The storage device according to claim 2, wherein the at least one processor operating component is configured to perform an embedding operation using the matrix data and the target vector.

5. The storage device according to claim 4, wherein the at least one processor is configured to calculate the embedding vector based on a multiplication operation between the matrix data and the target vector.

6. The storage device according to claim 5, wherein the at least one processor is configured to provide the embedding vector to the host.

7. A method of operating a storage device, comprising:
storing matrix data including a plurality of embedding vectors;
receiving, from a host, a request for an embedding vector from the plurality of embedding vectors, non-zero data included in a target vector related to the embedding vector, and an index of the non-zero data, wherein the index identifies a vector element having the non-zero data from a plurality of vector elements included in the target vector;
generating, by at least one processor, the target vector such that the vector element identified by the index includes the non-zero data and remaining vector elements of the plurality of vector elements include zero data; and
generating, by the at least one processor, the embedding vector based on the matrix data and the target vector.

8. The method according to claim 7, wherein the target vector comprises a one-hot vector.

9. The method according to claim 8, wherein the plurality of embedding vectors comprises information corresponding to a plurality of pieces of data formatted as n-dimensional vectors.

10. The method according to claim 8, wherein performing a multiplication operation comprises performing an embedding operation using the matrix data and the target vector.

11. The method according to claim 10, wherein performing the multiplication operation comprises calculating the embedding vector based on the multiplication operation between the matrix data and the target vector.

12. The method according to claim 11, further comprising:
providing the embedding vector to the host.

* * * * *